Oct. 21, 1941. E. BORMANN Re. 21,926
HIGH TENSION RUBBER INSULATED CABLE
Original Filed May 26, 1930
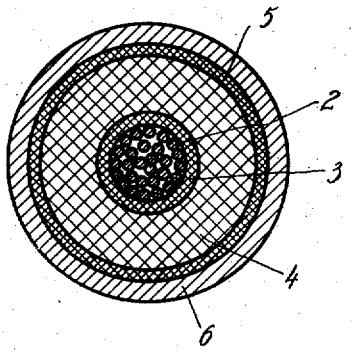
Inventor
Elisabeth Bormann
by Knight Bros
Attorneys Reissued Oct. 21, 1941 Re. 21,926

UNITED STATES PATENT OFFICE 21,926

HIGH TENSION RUBBER INSULATED CABLE

Elisabeth Bormann, Berlin-Charlottenburg, Germany, assignor to Siemens-Schuckertwerke Aktiengesellschaft, Berlin-Siemensstadt, Germany, a corporation of Germany Original No. 2,096,840, dated October 26, 1937, Serial No. 455,662, May 26, 1930. Application for reissue March 19, 1941, Serial No. 384,214. In Germany June 1, 1929

2 Claims. (Cl. 174—106)

My invention relates to high-tension, rubber, insulated, lead-covered power cables.

When manufacturing high-tension, rubber insulated heavy current cables with lead sheaths, it is not possible even in cables in which the proportion of the diameter outside of the insulation to the diameter of the conductor is 2.72 or approximately 2.72, to prevent undue breakdown stresses in the insulation, because it is impossible to completely avoid air and gas inclusions at the conductor and under the metal sheath, as there are always places at which the rubber does not adhere closely to the metal, i. e. to the conductor and the lead sheath. In such gas- and air-inclosures within the electric field, ionization is easily produced, through which chemical combinations take place, which deteriorate the insulation and are liable to be the cause of punctures of the insulation.

According to the invention the harmful influence on the gas and air inclosures is avoided by keeping away to the desired degree the gas and air-inclosures from the electric field. It would be possible to achieve this by placing immediately on the rubber insulation a conducting layer, for instance, in the form of metallized paper, tin foil or the like, such as is suggested for instance in the U. S. Patent No. 1,199,789 to Martin Hochstadter. As, however, even with this measure, small air inclosures are still liable to remain owing to unavoidable irregularities in the surface of the insulation, or are liable to form through bending of the cable, it is advisable to use, instead of metal foil, rubber layers, the insulation resistance of which is reduced to a certain degree. It is of advantage to make the resistance of these layers of such value as to be small in comparison to the resistance, or apparent resistance, of the insulation of the other rubber insulation. It is, however, not necessary for these layers to have a considerable conductivity. Such layers, which are advantageously made essentially of rubber and which contain graphite, or the like, as admixtures, join directly on to the other rubber so that between the layers and the rubber insulation proper there are no air- or gas-inclosures, and no ionization can, therefore, take place. Air and gas inclusions, if they occur at all, will therefore occur only between the layers of reduced resistance and the conductor and between these layers and the lead sheath.

By placing the layer of reduced insulation resistance on the conductor, one obtains, besides the aforementioned advantage, the further advantage that the increase in field intensity caused by the irregularity of the surface of the conductor is avoided and that at all parts of the inner surface of the rubber insulation a sufficiently uniform electrical stress prevails. In the drawing an example is given by which the present invention is reduced to practice. 2 is the conductor of the cable, upon which a layer 3 is placed, the resistance of which is small compared to that of the rubber insulation 4, laid round said layer in such a manner as to prevent inclosures of air or gas. Between the rubber insulation 4 and the sheath of the cable 6 a further layer 5 of smaller insulation resistance than insulation 4 is laid in such a manner that there are no inclosures of air between this layer and the rubber insulation.

The layers of reduced insulation resistance 3 and 5, composed of rubber having, mixed with and embedded in it, particles of substances of the class of graphite and soot, having electrical conducting properties, form semi-conducting layers, placed on and adapted to lie throughout in intimate contact with one or both surfaces of the rubber insulation to form with it an integral insulation to prevent ionization of gases and the layer 5 being grounded to bring the same to earth potential and conduct away the charging current of the insulation.

I claim as my invention:

1. A high tension heavy current cable having a conductor, a metal sheath and rubber insulation between said conductor and said sheath, and a layer of insulation of less resistance, adjacent to said conductor and said sheath, on each side of and in intimate contact with the surface of the rubber insulation, having substances of electrically conducting properties of the class of graphite and soot admixed to and embedded in said layer to form a semi-conducting insulation, to prevent ionization of gases prevailing at the boundary between the insulation and the conductor and sheath respectively.

2. An electric cable comprising a conductor surrounded by a body of insulating rubber, and a body of less resistance than the said insulating rubber, composed of rubber intermixed with conducting particles, superposed as a separate layer directly upon the said body of insulating rubber, in intimate contact with the entire outer surface thereof and grounded to bring the layer to earth potential and conduct away the charging current of the insulation.

ELISABETH BORMANN.